United States Patent
Heath et al.

(10) Patent No.: US 9,827,720 B2
(45) Date of Patent: Nov. 28, 2017

(54) MULTI-STATE BLADDER FOR MANUFACTURE OF COMPOSITE MATERIAL

(71) Applicant: The Boeing Company, Chicago, IL (US)

(72) Inventors: Edward Heath, Mount Pleasant, SC (US); Andrew Elmer Modin, Charleston, SC (US); Paul D. Shaw, Charleston, SC (US); Raviendra Suriyaarachchi, Charleston, SC (US)

(73) Assignee: The Boeing Company, Chicago, IL (US)

( * ) Notice: Subject to any disclaimer, the term of this patent is extended or adjusted under 35 U.S.C. 154(b) by 358 days.

(21) Appl. No.: 14/822,237

(22) Filed: Aug. 10, 2015

(65) Prior Publication Data

US 2017/0043540 A1    Feb. 16, 2017

(51) Int. Cl.
| | | |
|---|---|---|
| *B29C 70/34* | (2006.01) | |
| *B29C 70/54* | (2006.01) | |
| *B29C 70/44* | (2006.01) | |
| *B29C 33/50* | (2006.01) | |
| *B29K 105/08* | (2006.01) | |

(52) U.S. Cl.
CPC .......... *B29C 70/342* (2013.01); *B29C 33/505* (2013.01); *B29C 70/446* (2013.01); *B29C 70/54* (2013.01); *B29K 2105/0872* (2013.01); *B29K 2995/0008* (2013.01)

(58) Field of Classification Search
USPC ........................................................ 264/313
See application file for complete search history.

(56) References Cited

U.S. PATENT DOCUMENTS

| | | | | |
|---|---|---|---|---|
| 2,503,431 | A | * | 4/1950 | Bender .................. B21D 53/78 |
| | | | | 219/137 R |
| 3,425,642 | A | | 2/1969 | May |
| 4,754,543 | A | * | 7/1988 | Spivy ....................... B26D 3/16 |
| | | | | 279/2.1 |
| 5,366,684 | A | | 11/1994 | Corneau, Jr. |
| 7,357,166 | B2 | | 4/2008 | Pham et al. |
| 7,530,530 | B2 | | 5/2009 | Engwall et al. |

(Continued)

*Primary Examiner* — Jacob T Minskey
*Assistant Examiner* — Baileigh K Darnell
(74) *Attorney, Agent, or Firm* — McDonnell Boehnen Hulbert & Berghoff LLP

(57) ABSTRACT

Within examples, methods and systems for a multi-state bladder or elastomeric apparatus for manufacture of composite material are provided. In one example, the elastomeric apparatus comprises an elastomer housing, and magnetic components within the elastomer housing such that application of a magnetic field to the elastomer apparatus changes a rigidity state of the elastomer housing to a secondary state. The secondary state is supportive of a surface compaction applied to the elastomer housing. The elastomeric apparatus may also include rods within the housing extending along the housing, and the magnetic components are mounted to the rods in a rotatable manner. The magnetic components can react to a magnetic field in a way that aligns the magnetic components by rotating on the rods to cause the housing to have a rigid surface state, and to cause the housing to have a flexible surface state in absence of the magnetic field.

20 Claims, 9 Drawing Sheets

(56) References Cited

U.S. PATENT DOCUMENTS

| | | | |
|---|---|---|---|
| 8,210,547 B2 * | 7/2012 | Rodenbeck | B60G 11/16 |
| | | | 280/5.516 |
| 8,293,051 B2 | 10/2012 | Morris et al. | |
| 8,430,984 B2 | 4/2013 | Lee et al. | |
| 8,696,610 B2 * | 4/2014 | Solomon | A61N 2/004 |
| | | | 600/15 |
| 8,800,953 B2 | 8/2014 | Morris et al. | |
| 8,945,325 B2 | 2/2015 | Everhart et al. | |
| 8,974,217 B2 | 3/2015 | Everhart et al. | |
| 2008/0241302 A1 * | 10/2008 | Graham | B29C 33/04 |
| | | | 425/172 |

* cited by examiner

MULTI-STATE BLADDER FOR MANUFACTURE OF COMPOSITE MATERIAL

FIELD

The present disclosure generally relates to methods and equipment for fabricating composite resin parts, and more particularly to a bladder system used in curing composite parts.

BACKGROUND

Composite parts, such as those used in the manufacture of aircraft, can be constructed using various production methods, such as filament winding, tape placement, overbraid, chop fiber roving, coating, hand lay-up, or other composite processing techniques and curing processes. Most of these processes use a rigid cure tool/mandrel on which composite material is applied and then cured into a rigid composite part. For example, automated fiber placement (AFP) machines may be used to place fiber reinforcements on molds or mandrels to form composite layups. Following, composite parts may be cured within an autoclave that applies heat and pressure to the part during a cure cycle.

Some composite part geometries include internal cavities that may cause the part to collapse under application of composite material or autoclave pressure unless a tool such as an inflatable bladder is placed in the cavity. Such an inflatable bladder may be inflated during a cure process so as to react the autoclave pressure force applied to the part. Typically, these inflatable bladders are pressurized by venting them to the autoclave pressure through a vacuum bag.

However, during the automated fiber placement of the composite materials, the AFP machines exert pressure on the mold and bladder. Thus, existing inflatable bladders used in fabrication of composite material layups to inflate and provide even pressure during the cure cycle often deform due to the exerted pressure, which can impact laminate quality. Other solutions that use stiff bladders to maintain the internal cavity shape during the curing process typically only give a small improvement in deformation during fiber placement, but may not perform as well during the cure cycle.

Still other types of bladders have other drawbacks. Removable rigid bladder inserts can be used, but this requires a secondary installation and removal operation requiring additional labor and time. Solid mandrels can be used in place of bladders to provide resistance to deformation during fiber placement, but such mandrels are heavy and often do not provide even pressure during the cure cycle that reduces part quality. Shape memory polymers can also be used to change a state of bladder stiffness, however, this type of bladder is also typically heavier and very complex to design. Accordingly, there is a need for a bladder design that will allow the bladder to be rigid for automated fiber placement improving part quality, and also allow the bladder to be flexible during the curing cycle.

SUMMARY

In one example, an elastomeric apparatus for use in manufacture of a composite component is described. The elastomeric apparatus comprises an elastomer housing, and a plurality of magnetic components within the elastomer housing in a predetermined manner such that application of a magnetic field to the elastomer apparatus changes a rigidity state of the elastomer housing to a secondary state. The secondary state is supportive of a surface compaction applied to the elastomer housing.

In another example, an elastomeric apparatus for use in manufacture of a composite component is described that comprises a housing having a flexible surface state and a rigid surface state, and one or more rods within the housing extending along the housing. The elastomeric apparatus also includes a plurality of magnetic components mounted to the one or more rods in a rotatable manner, and the plurality of magnetic components react to a magnetic field in a way that aligns the magnetic components by rotating on the one or more rods to cause the housing to have the rigid surface state. The plurality of magnetic components also causes the housing to have the flexible surface state in absence of the magnetic field.

In still another example, a method for altering a surface rigidity of an elastomeric apparatus is described. The method comprises providing a housing of the elastomeric apparatus having a first surface state and a second surface state, changing a surface rigidity state of the housing during localized exposure to a magnetic field, such that the housing has the first surface state, and changing the surface rigidity state of the housing in absence of the magnetic field, such that the housing has the second surface state.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, methods and apparatus for providing structural support to a mold or mandrel, such as for shaping a composite part, are described. A support apparatus may comprise a bladder capable of multiple states including a first state that is a soft and/or flexible state, and a second state that is a rigid and/or stiff state. The bladder changes from the soft state to the rigid state by application of an energy field or mechanical energy. Thus, the bladder may be placed in the rigid state during curing of the composite material on the mandrel, and after a cure cycle, the bladder may be placed in the soft state to provide clearance to be removed from the cured composite part.

In some examples, depending on specific manufacturing uses, a natural state of the bladder might be normally rigid and activated to be flexible or soft, or normally flexible or soft and activated to be rigid.

Thus, a flexible bladder can be used in fabrication of composite material layups to inflate and provide even pressure during the cure cycle. Further, during automated lamination of composite materials, such as with automated fiber placement (AFP) process, the automated equipment exerts pressure on the bladder which can cause the bladder to deform and result in excess material being placed. However, use of the multi-state bladder will allow the bladder to be rigid during lamination so as to improve part quality and also allow the bladder to be flexible during the curing cycle. For example, it may be desirable to have the ability for the bladder to become rigid during a short period of time when AFP equipment is pressing on the bladder enables the composite material to be applied more efficiently without adding steps to the manufacturing process.

Figure 1:
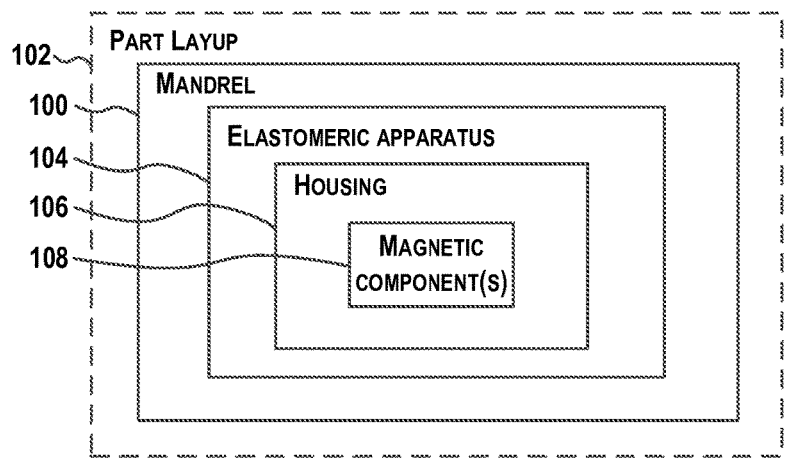
FIG. 1 illustrates an example system including a mandrel be used to form and/or cure a part layup comprising multiple plies of fiber reinforced polymer resin, according to an example embodiment.

Referring now to FIG. 1, a mandrel 100 may be used to form and/or cure a part layup 102 comprising multiple plies (not shown) of fiber reinforced polymer resin. For example, multiple plies of fiber reinforced polymer plies are laid up over the mandrel 100 in order to form the plies into a desired part shape. The part layup 102 may partially or fully surround the mandrel 100, such that the mandrel 100 is at least substantially enclosed by the part layup 102. The mandrel 100 includes a flexible elastomeric apparatus 104 having flexible housing 106 forming an enclosure that may collapse inwardly when the flexible elastomeric apparatus 104 is placed into a flexible state to allow the mandrel 100 to be withdrawn from the part layup 102 either after the layup is compacted and/or cured. The flexible elastomeric apparatus 104 further includes magnetic components 108 that are configured to align between the housing 106 of the flexible elastomeric apparatus 104. The magnetic components 108 can be configured to restrain the flexible elastomeric apparatus 104 against deformation as the part layup 102 is applied.

The elastomeric apparatus 104 may be a bladder or other structural component for curing the part layup 102. To enable flexibility of the elastomeric apparatus 104, the housing 106 has a flexible surface state and a rigid surface state based on alignment of the magnetic components 108.

The magnetic components 108 may be rectangular support structures composed of magnetic material, or may be a homogeneous mixture of ferrous metallic components arranged within the housing 106 in a predetermined manner. Any type of magnetic or metallic material may be used for the magnetic components 108. The magnetic components 108 may be structures that are disposed within, but are separate from the housing 106.

The part layup 102 may be cured to form any of a variety of composite components, structures, or parts that form full or partial enclosures having uniform or non-uniform cross sections along their lengths. For example, the cured part may comprise a duct (not shown) or a conduit (not shown) used to transport fluids, such as, for example and without limitation, air ducts and fuel lines used in a wide variety of applications, including vehicles. An example of a composite component that may benefit from use of the mandrel 100 and flexible elastomeric apparatus 104 to form the part layup 102 is illustrated in FIG. 2.

Figure 2:
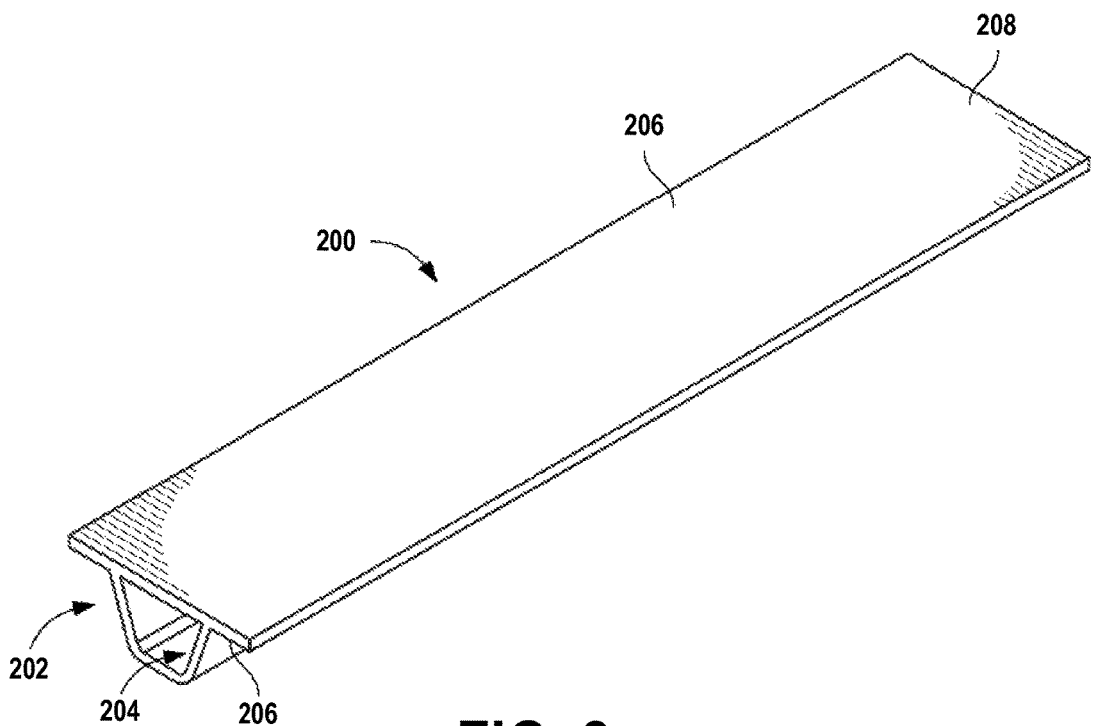
FIG. 2 illustrates an example of a composite component that may benefit from use of the mandrel and flexible elastomeric apparatus to form the part layup as described in FIG. 1, according to an example embodiment.

In FIG. 2, the disclosed flexible apparatus and curing method may be employed to cure a variety of composite resin parts of various geometries, having one or more internal cavities. For example, and without limitation, the disclosed flexible bladder and curing method may be used in fabrication of a fiber reinforced composite resin stringer 200. In one arrangement, the stringer 200 may comprise a multiply layup of prepreg. In the illustrated arrangement, the stringer 200 comprises a hat section 202 forming an internal stringer cavity 204, a pair of laterally extending flange sections 206, and a substantially flat skin section 208 that is consolidated together with the flange sections 206 during curing. As those of ordinary skill in the art will recognize, alternative stringer geometries are possible.

The stringer 200 may be fabricated using the mandrel 100 and flexible elastomeric apparatus 104 in FIG. 1 by applying the part layup 102 to the mandrel 100 with the flexible elastomeric apparatus 104 inserted into the mandrel 100. After curing, the part layup 102 forms the stringer 200. The flexible elastomeric apparatus 104 fills the stringer cavity 204 that is a hollow trapezoidal space. The flexible elastomeric apparatus 104 functions to react a force of a lamination head during application of the part layup 102, and so the flexible elastomeric apparatus 104 may be rigid to react to loads during skin lamination, and flexible to be removed after cure.

In another embodiment, the stringer 200 is preformed and is uncured. The mandrel 100 is positioned within the stringer cavity 204 and has a shape that substantially conforms to the corresponding stringer cavity 204 such that the mandrel 100 and internal flexible elastomeric apparatus 104 may provide support to the stringer 200 during curing. The mandrel 100 of the illustrated embodiment has a trapezoidal shape to conform to a hat-shaped stringer 200, although the mandrel could have any number of other shapes to conform to differently shaped stringers.

The mandrel 100 may be formed of any elastomeric material, such as Teflon® (E.I. du Pont de Nemours and Company) coated silicone or hard rubber, and may be pliable to enable the mandrel 100 to conform to various configurations. The elastomeric apparatus 104 may be formed, for example and without limitation, from flexible silicon rubber, and the housing 106 may be an elastomer housing.

Example composite material used for the stringer 200 may be generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the mandrel 100 (or mold) to pre-form the tape or fabric into a desired shape of the stringer 200 as defined by the mandrel 100. The stringer 200 could be any suitable dimension to provide various degrees of reinforcement, and could comprise any number of plies of prepreg tape or fabric.

Figure 3:
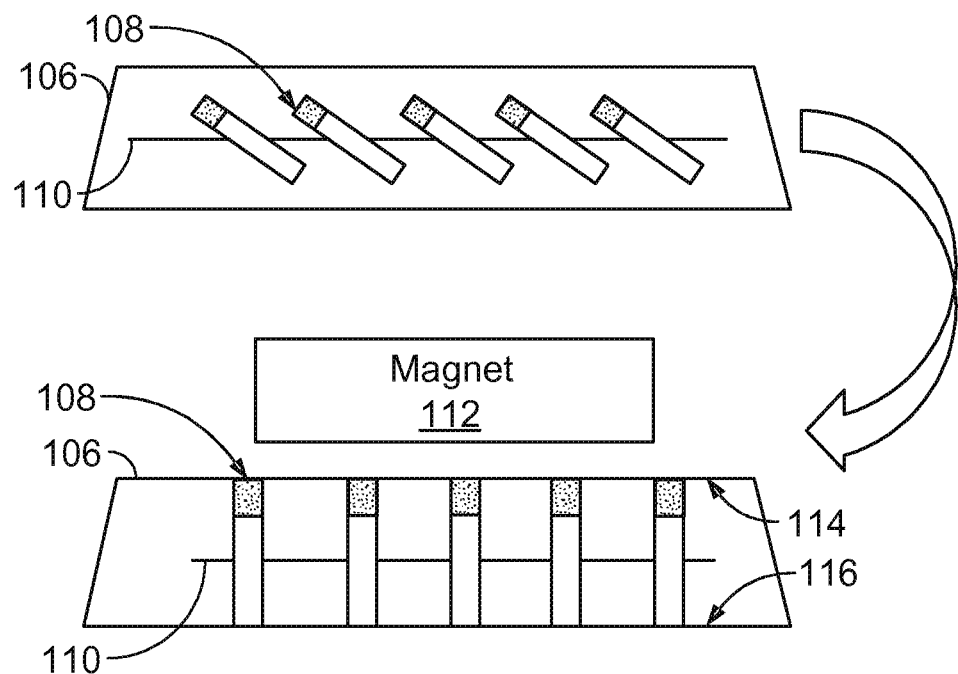
FIG. 3 illustrates the housing of the elastomeric apparatus including the magnetic components, according to an example embodiment.

FIG. 3 illustrates the housing 106 of the elastomeric apparatus 104 including the magnetic components 108. The housing 106 includes a center spine rod 110 extending along a length of the housing 106, and the magnetic components 108 are each mounted to the center spine rod 110 spaced apart along the length of the housing 106. The magnetic components 108 are mounted to the center spine rod 110 in a rotatable manner, such that the magnetic components 108 react to a magnetic field in a way that aligns the magnetic components 108 by rotating on the center spine rod 110 to cause the housing 106 to have the rigid surface state, and the magnetic components 108 cause the housing 106 to have the flexible surface state in absence of the magnetic field.

FIG. 3 illustrates at the top that the elastomer apparatus housing 106 has a first state in which the elastomer housing 106 is flexible in an absence of a magnetic field. The housing 106 is flexible because the magnetic components 108 are relaxed and not providing a rigid internal structure for the housing 106. The magnetic components 108 are mounted to the center spine rod 110 spaced apart from each other along a length of the housing 106 such that the magnetic components 108 lay substantially horizontal or lay at about a 45° angle along the length of the housing 106 in the absence of the magnetic field. In other examples, the magnetic components 108 may be non-vertical in absence of a localized magnetic field, and non-vertical may include being at angles less than 180°, for example, with respect to the center spine rod 110.

At the bottom of FIG. 3, application of a magnetic field by a magnet 112 to the housing 106 changes a rigidity state of the housing 106 to a secondary state that is supportive of a surface compaction applied to the elastomer housing 106. In the secondary state, the housing 106 is rigid in a presence of the magnetic field because the magnetic components 108 vertically align within the housing 106 to provide the internal rigid structure for the housing 106. For example, the magnetic components 108 cause the housing 106 to have the rigid surface state by aligning vertically along a length of the housing 106 through an upward rotation so as to contact a top 114 and a bottom 116 of an interior of the flexible housing 106.

Alignment of the magnetic components 108 occurs along a length of the housing 106 and substantially perpendicular to the center spine rod 110 as shown in FIG. 3. As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 4:
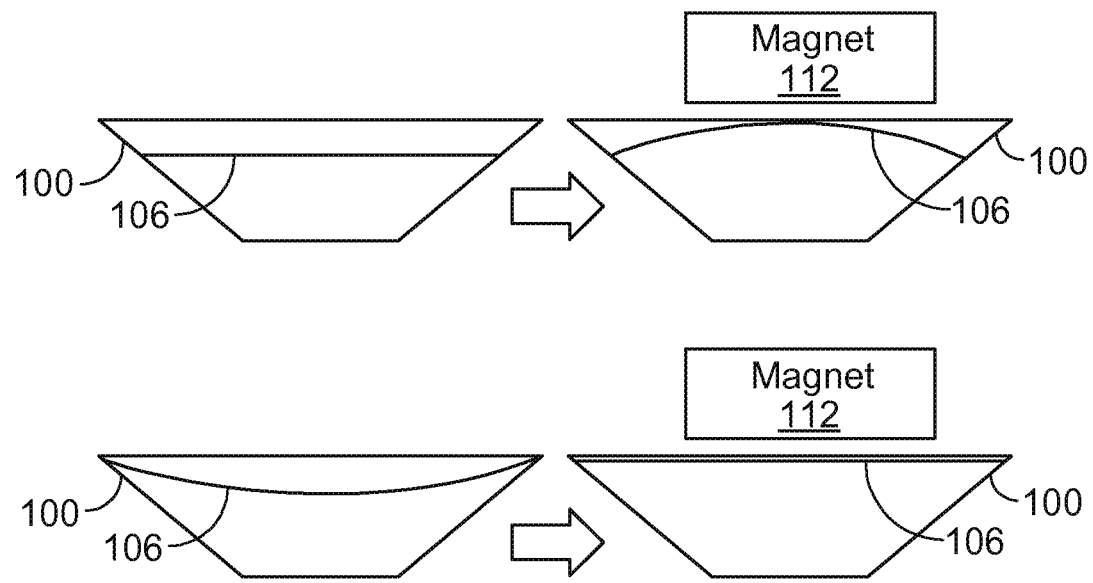
FIG. 4 illustrates operation of the mandrel with the elastomeric apparatus inserted, according to an example embodiment.

FIG. 4 illustrates operation of the mandrel 100 with the elastomeric apparatus 104 inserted. At the top of FIG. 4, the housing 106 is relaxed and not abutting a surface of the mandrel 100. As the magnet moves across the mandrel 100, the magnetic components (not shown in FIG. 4) align causing the housing 106 to become rigid and to provide support for the mandrel 100. FIG. 4 shows two illustrations of possible configurations of the housing 106 in which at the top illustration in FIG. 4, the housing 106 provides a rounded internal support for the mandrel 100, and at the bottom illustration in FIG. 4, the housing 106 provides a flat or horizontal internal support (matching a shape of the mandrel 100). Different configurations of the housing 106 support are based on configurations and alignment of the internal magnetic components, and spacing of the magnetic components (described below).

Figure 5:
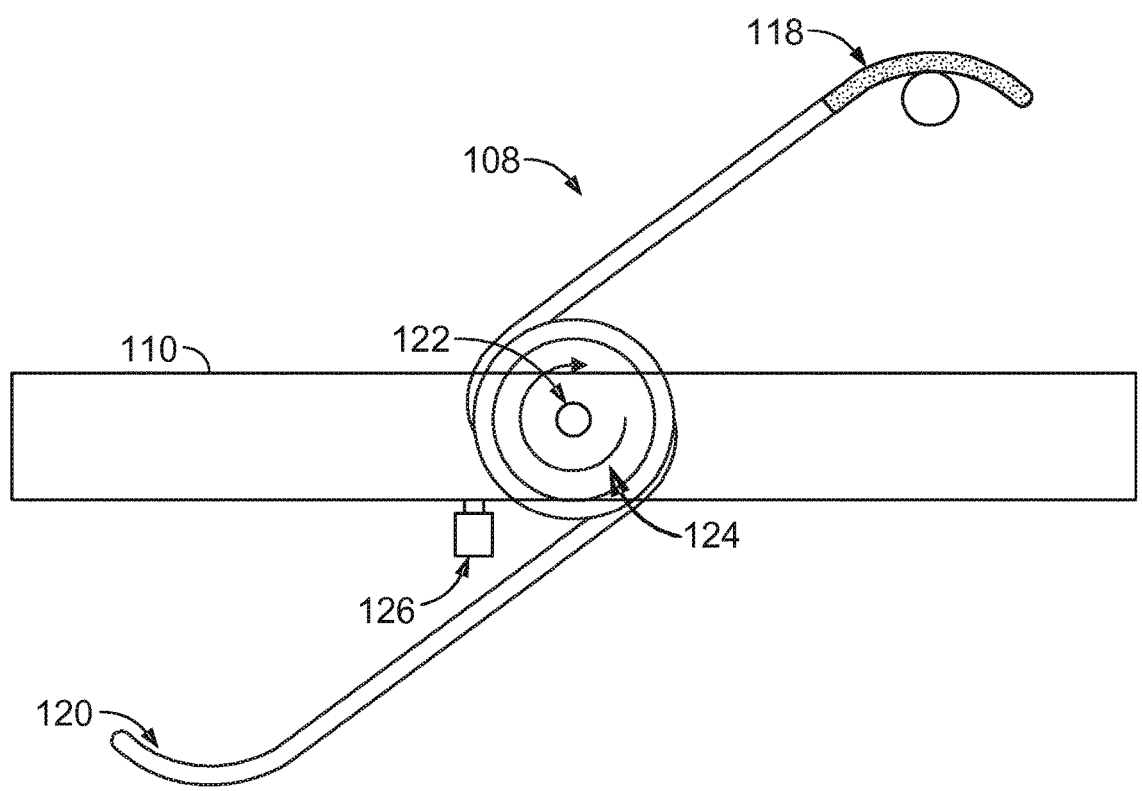
FIG. 5 illustrates an example of the magnetic component coupled to the center spine rod, according to an example embodiment.

FIG. 5 illustrates an example of the magnetic component 108 coupled to the center spine rod 110. In this example, the magnetic component 108 includes an upper arm 118 coupled to a lower arm 120 via a rotational bearing 122. The magnetic component 108 is mounted to the center spine rod 110 via the rotational bearing 122 enabling the magnetic component to rotate. The magnetic component further includes a spring 124 coupled to the rotational bearing 122 and the center spine rod 110 to cause the magnetic component 108 to rotate to be substantially horizontal along a length of the housing in the absence of the magnetic field. A rotation stop 126 is mounted to the center spine rod 110, and thus, the spring 124 is configured to force the magnetic component 108 to rotate such that the lower arm 120 contacts the rotation stop 126 in the absence of the magnetic field. In further examples, the upper arm 118 comprises a magnetically sensitive material, and the lower arm 120 comprises a non-magnetically sensitive material. In this manner, upon application of a magnetic field, the upper arm 118 is attracted to the field causing the magnetic component 108 to rotate to be vertical. In the absence of the magnetic field, the spring 124 provides a force causing the magnetic component 108 to rotate in an opposite direction such that the magnetic component is no longer vertical, and may reside at about a 45° angle when the lower arm 120 contacts the rotation stop 126.

Figure 6:
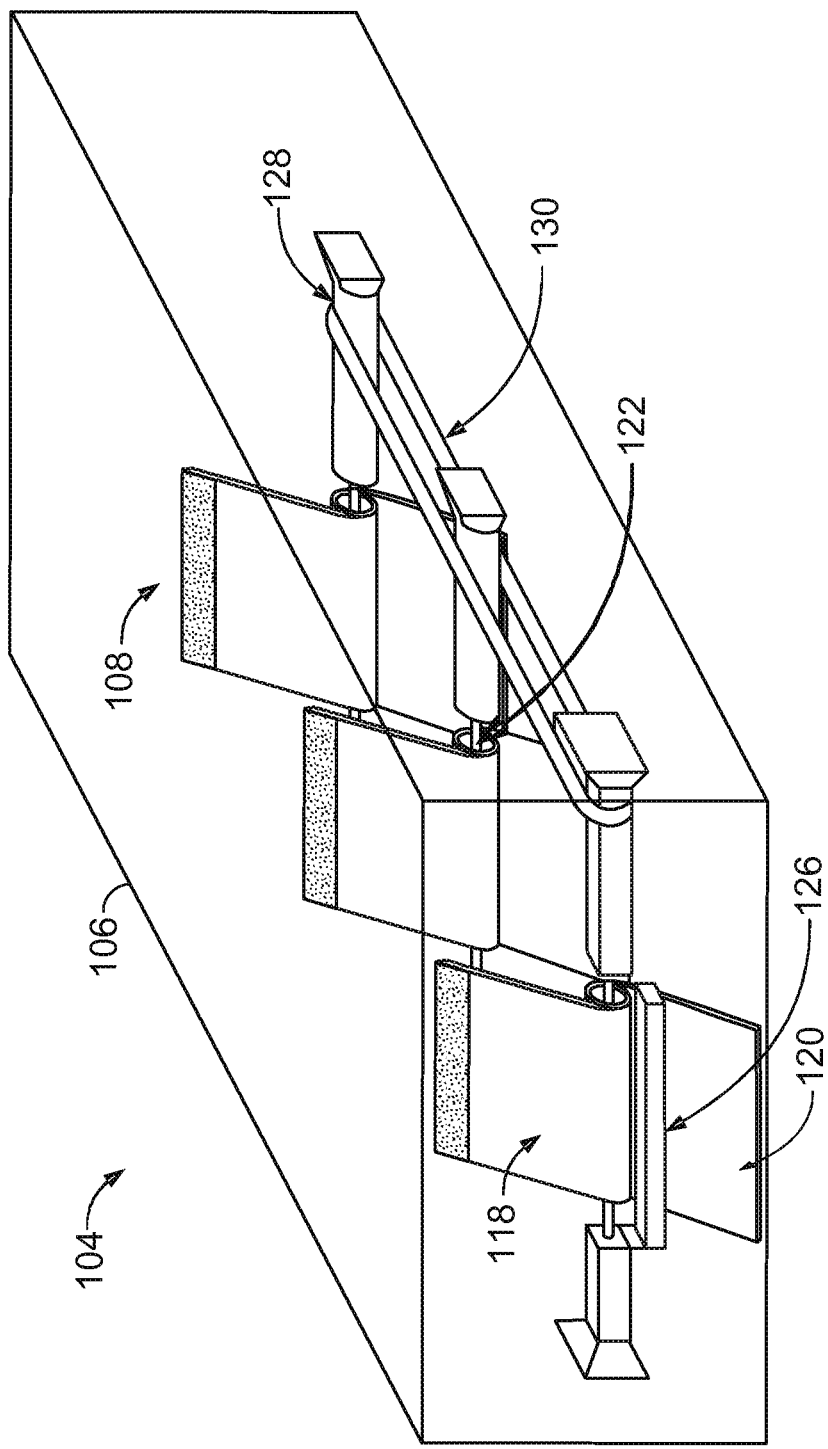
FIG. 6 illustrates another example of the elastomeric apparatus, according to an example embodiment.

FIG. 6 illustrates another example of the elastomeric apparatus 104. In this example, the elastomeric apparatus 104 includes rods, such as rod 128, for each of the magnetic component, such as the magnetic component 108, within the housing extending along a width of the housing 106. For example, the magnetic component 108 is mounted to the rod 128 in a rotatable manner via the rotational bearing 122 of the magnetic component 108. In this way, the magnetic component 108 reacts to a magnetic field in a way that aligns the magnetic component 108 by rotating on the rod 128 to cause the elastomer housing 106 to have the secondary rigid state, and the magnetic component 108 causes the elastomer housing 106 to have the first flexible state in absence of the magnetic field. The upper arm 118 comprises a magnetically sensitive material and can be attracted to an applied magnetic field, and the lower arm 120 comprises a non-magnetically sensitive material.

As described, each magnetic component 108 includes a spring (not shown in FIG. 6) coupled to the rod 128 to cause the magnetic component 108 to rotate to be substantially horizontal or at about a 45° angle along a length of the housing 106 in the absence of the magnetic field. The housing 106 includes a plurality of rotation stops coupled to each rod, such as the rotation stop 126, and in the absence of the magnetic field, the spring causes the magnetic component 108 to rotate until contact with the rotation stop 126.

The housing 106 further includes links, such as link 130, coupling the rods lengthwise along the housing 106. A plurality of magnetic components are mounted on the plurality of rods that are spaced apart from each other along a length of the housing 106 by the links 130 such that the plurality of magnetic components lay substantially horizontal or at about a 45° angle along the length of the housing in the absence of the magnetic field.

In FIG. 6, the housing 106 is shown as a rectangular shape, and the rod 128 extends between sides of the housing 106. In other examples, the housing 106 may have a trapezoidal shape and the rod extends between non-parallel sides of the housing 106, or a rounded hat shape and the rod 128 can extend between sides of the housing 106. Still other shapes of the housing 106 are possible depending on application of the elastomeric apparatus 104.

Figure 7:
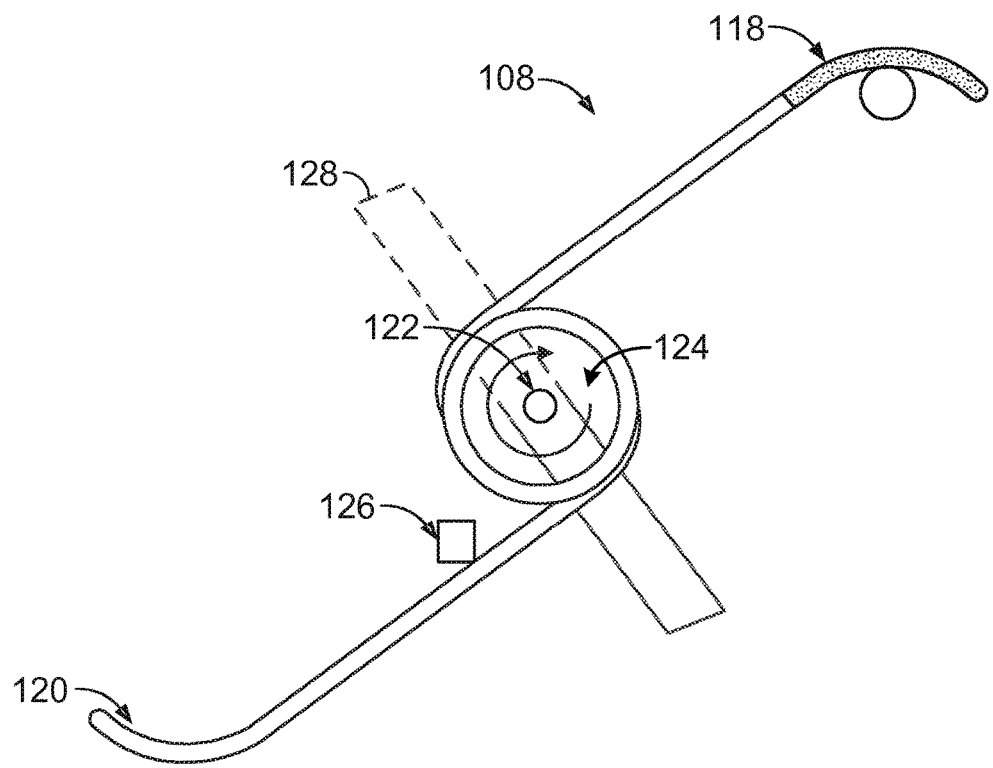
FIG. 7 illustrates a side view of the magnetic component mounted to the rod, according to an example embodiment.

FIG. 7 illustrates a side view of the magnetic component 108 mounted to the rod 128. In FIG. 7, the magnetic component 108 is relaxed and no magnetic field is applied. Thus, the lower arm 120 is forced against the rotation stop 126 due to the spring 124.

Figure 8:
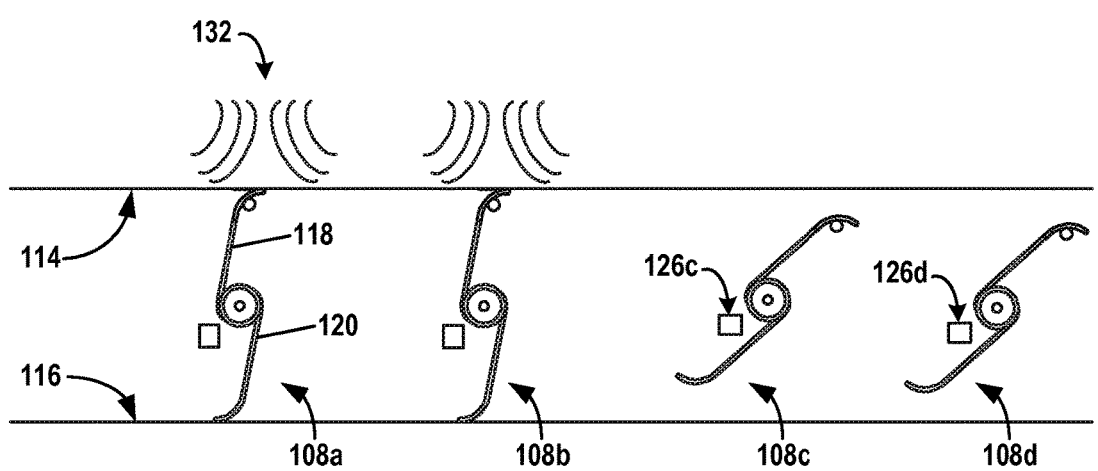
FIG. 8 illustrates an example method for altering the surface rigidity state of the elastomeric apparatus, according to an example embodiment.

FIG. 8 illustrates an example method for altering the surface rigidity state of the elastomeric apparatus. In FIG. 8, four magnetic components 108*a-d* are shown, and may be mounted to individual rods (not shown) or a center spine rod (not shown). In response to localized exposure to a magnetic field 132, the magnetic components 108*a-b* align vertically so that the upper arm 118 contacts the top 114 of the interior of the housing and the lower arm 120 contacts the bottom 116 of the interior of the housing, while the magnetic components 108*c-d* are recoiled against respective rotation stops 126*c-d*.

As shown in FIG. 8, the magnetic components 108*a-d* are mounted within the housing and spaced about a few inches apart. Within some designs, the magnetic component may be 0.5 inches to a few inches in length. With these dimensions, the contact with the top 114 of the interior of the housing and the bottom 116 of the interior of the housing may not be across an entire surface area, but may be at discrete points along the interior to provide structure to the housing 106.

Figure 9:
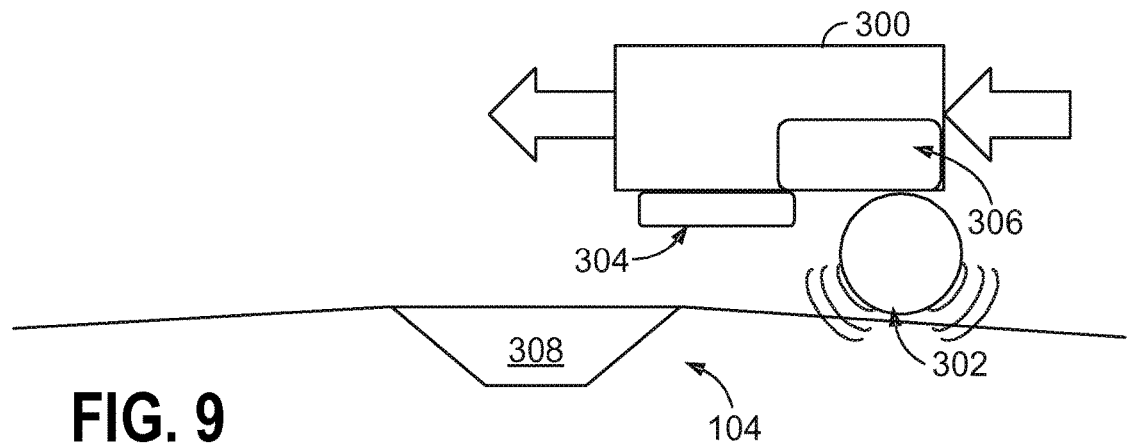
FIG. 9 illustrates the example method for altering the surface rigidity state of the elastomeric apparatus in which elastomeric apparatus is in a compliant or flexible state, according to an example embodiment.
Figure 10:
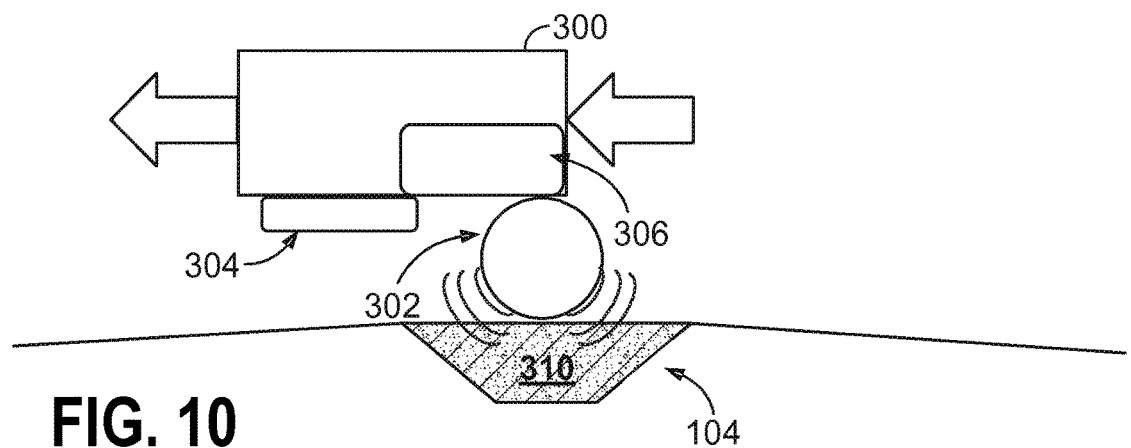
FIG. 10 illustrates the example method for altering the surface rigidity state of the elastomeric apparatus in which elastomeric apparatus is in a rigid state, according to an example embodiment.
Figure 11:
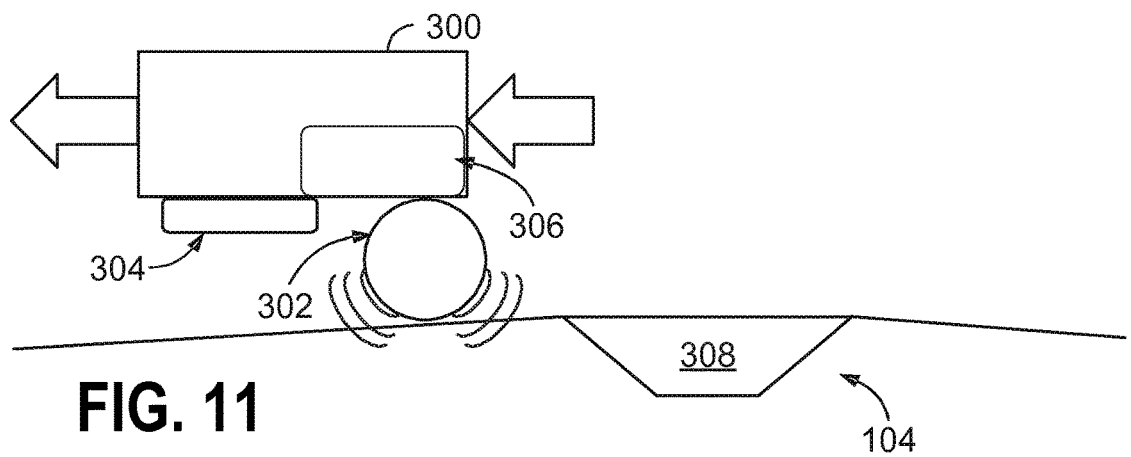
FIG. 11 illustrates the example method for altering the surface rigidity state of the elastomeric apparatus in which elastomeric apparatus returns to the flexible state, according to an example embodiment.

FIGS. 9-11 illustrate the example method for altering the surface rigidity state of the elastomeric apparatus during automated lamination. In FIG. 9, the elastomeric apparatus 104 is in a compliant state 308 or flexible state. An AFP machine head 300 that includes an AFP roller 302 and an IR heater 304 for application of the fibers moves across the mandrel (not shown) with the elastomeric apparatus 104 inserted. The AFP machine head 300 is also shown to include a field generator 306, which may generate any one of magnetic or magnetic differential fields, electromagnetic fields (e.g., radio waves), microwave fields, infrared (IR) fields, X-ray fields, gamma ray fields, or other electric fields (e.g., for electro-active polymers). As the AFP machine head 300 travels across the elastomeric apparatus 104, the magnetic components (not shown in FIGS. 9-11) in the elastomeric apparatus 104 react to the generated field by the field generator 306 to vertically align and alter the surface rigidity state of the tooling mandrel. For example, FIG. 10 illustrates the elastomeric apparatus 104 in a rigid state 310. The magnetic components temporarily snap into vertical position as the AFP machine head 300 rolls over and then the magnetic components relax again to return the elastomeric apparatus 104 to the compliant state 308 or flexible state, as shown in FIG. 11.

As shown in FIGS. 9-11, the rigid state of the elastomeric apparatus 104 is supportive of surface compaction applied by the AFP machine head 300. During AFP fiber placement, the AFP roller 302 rolls over the elastomeric apparatus 104 and applies forces that may slightly deform the elastomeric apparatus. Using methods described herein though, the internal magnetic components can provide support to resist the force of the AFP roller 302. Examples forces applied by the AFP roller 302 may be about 100 PSI, or between about 0-200 PSI, during material application. Thus, the magnetic components 108 may provide structure to the housing 106 to resist such forces.

Thus, within examples as shown in FIGS. 9-11, the elastomeric apparatus 104 may be configured into the compliant state 308 initially, and then a lamination device (e.g., AFP machine head 300) may pass by the elastomeric apparatus 104 causing the elastomeric apparatus 104 to transition to the rigid state 310.

Another configuration may be used as well, such that the elastomeric apparatus 104 is placed into the rigid state 310 during an entire lamination process, such as during operation of the AFP machine head 300 for application of multiply plies and multiple passes of the lamination device because a compliant elastomeric apparatus 104 may allow the material to relax and wrinkle. Thus, in this configuration, the elastomeric apparatus 104 may be activated not by the presence of the lamination device (AFP machine head 300), but possibly by another applied external magnetic field, for example.

Figure 12:
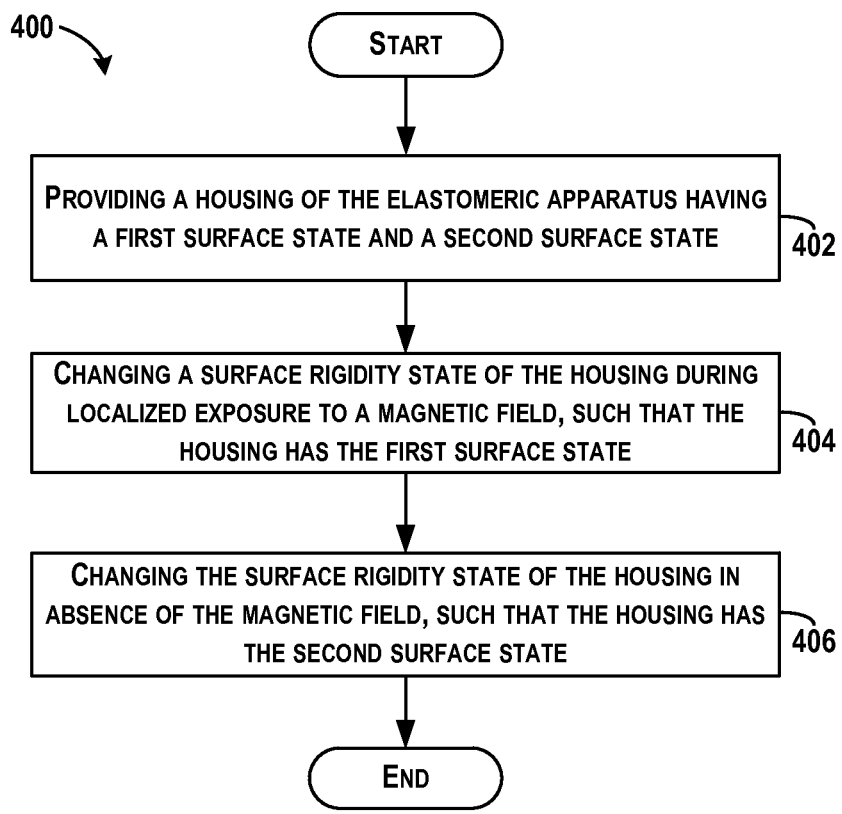
FIG. 12 shows a flowchart of an example method for altering a surface rigidity of an elastomeric apparatus, according to an example embodiment.

FIG. 12 shows a flowchart of an example method 400 for altering a surface rigidity of an elastomeric apparatus, according to an example embodiment. Method 400 shown in FIG. 12 presents an embodiment of a method that, for example, could be used by the system shown in FIG. 1, for example, and may be performed by components of the system in FIG. 1. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 402, the method 400 includes providing the housing 106 of the elastomeric apparatus 104 having a first surface state and a second surface state. At block 404, the method 400 includes changing a surface rigidity state of the housing 106 during localized exposure to a magnetic field, such that the housing 106 has the first surface state. At block 406, the method 400 includes changing the surface rigidity state of the housing 106 in absence of the magnetic field, such that the housing 106 has the second surface state. In some examples, the first surface state is a rigid surface state, and the second surface state is a flexible surface state. In other examples, the first surface state is a flexible surface state, and the second surface state is a rigid surface state.

Figure 13:
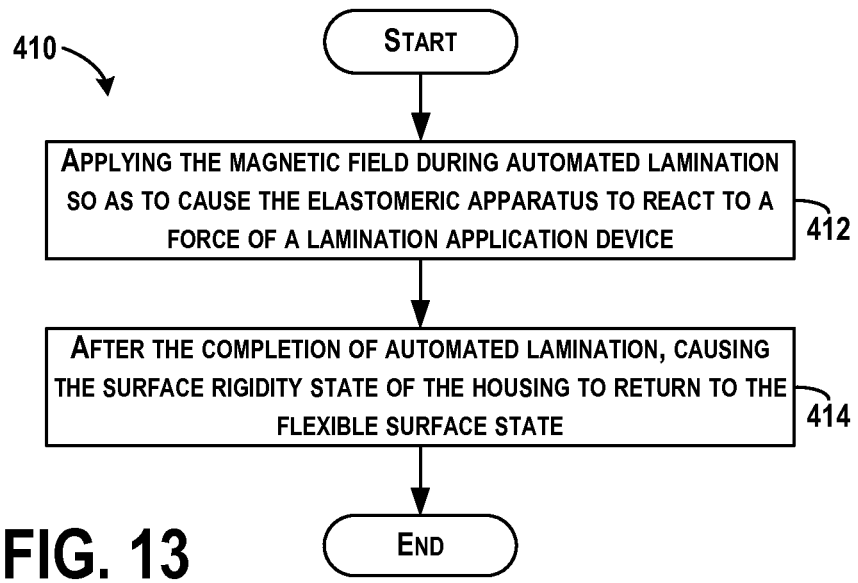
FIG. 13 shows a flowchart of another example method for altering a surface rigidity of an elastomeric apparatus, according to an example embodiment.

FIG. 13 shows a flowchart of another example method 410 for altering a surface rigidity of an elastomeric apparatus, according to an example embodiment. The method 410 may be performed in combination with the method 400 shown in FIG. 12, for example.

As shown at block 412 in FIG. 13, the method 410 includes applying the magnetic field during automated lamination (e.g., application of fiber placement) so as to cause the elastomeric apparatus 104 to react to a force of a lamination application device (e.g., the AFP machine head 300). As shown at block 414, the method 410 includes after the automated lamination, causing the surface rigidity state of the housing 106 to return to the flexible surface state.

Figure 14:
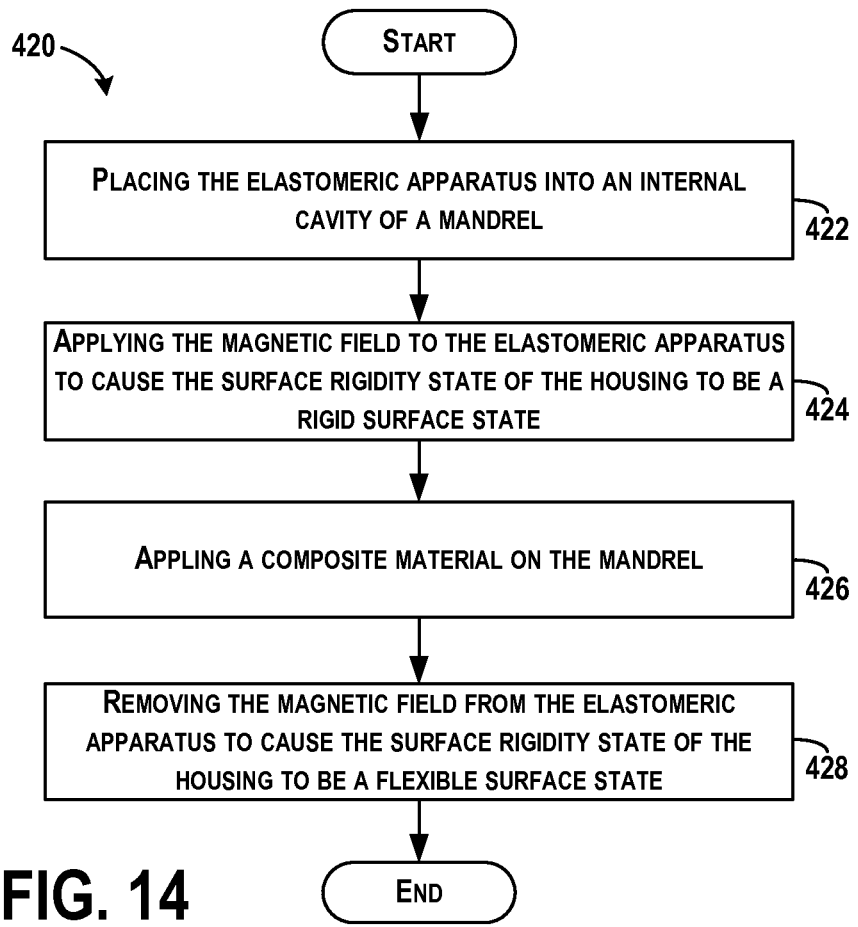
FIG. 14 shows a flowchart of another example method for altering a surface rigidity of an elastomeric apparatus, according to an example embodiment.

FIG. 14 shows a flowchart of another example method 420 for altering a surface rigidity of an elastomeric apparatus 104, according to an example embodiment. The method 420 may be performed in combination with the method 400 shown in FIG. 12, for example.

As shown at block 422, the method 420 includes placing the elastomeric apparatus 104 into an internal cavity of the mandrel 100. As shown at block 424, the method 420 includes applying the magnetic field to the elastomeric apparatus 104 to cause the surface rigidity state of the housing 106 to be a rigid surface state. As shown at block 426, the method 420 includes applying a composite material, or part layup 102, on the mandrel 100. As shown at block 428, the method 420 includes removing the magnetic field from the elastomeric apparatus 104 to cause the surface rigidity state of the housing 106 to be a flexible surface state. Following, the elastomeric apparatus 104 may be removed from the mandrel 100.

Figure 15:
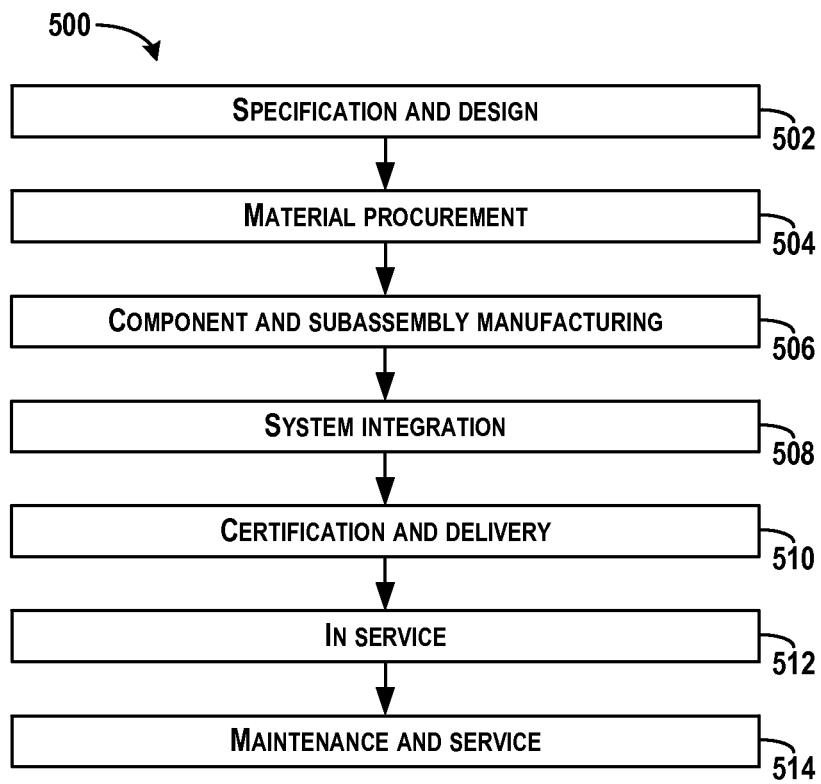
FIG. 15 shows a flowchart of an example aircraft manufacturing and service method, according to an example embodiment.
Figure 16:
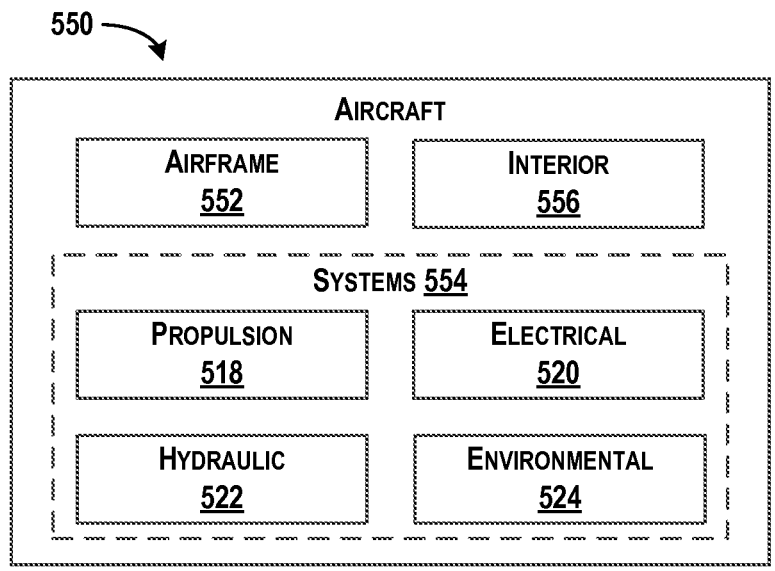
FIG. 16 shows a block diagram of an aircraft, according to an example embodiment.

Embodiments of the disclosure may find use in a variety of potential applications, particularly in the transportation industry, including for example, aerospace, marine, automotive applications and other application where autoclave curing of composite parts may be used. Therefore, referring now to FIGS. 15 and 16, embodiments of the disclosure may be used in the context of an aircraft manufacturing and service method 500 as shown in FIG. 15 and an aircraft 550 as shown in FIG. 16. Aircraft applications of the disclosed embodiments may include, for example, without limitation, curing of stiffener members such as, without limitation beams, spars and stringers, to name only a few. During pre-production, exemplary method 500 may include specification and design 502 of the aircraft 550 and material procurement 504. During production, component and subassembly manufacturing 506 and system integration 508 of the aircraft 550 takes place. Thereafter, the aircraft 550 may go through certification and delivery 510 in order to be placed in service 512. While in service by a customer, the aircraft 550 is scheduled for routine maintenance and service 514, which may also include modification, reconfiguration, refurbishment, and so on.

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 550 produced by exemplary method 500 may include an airframe 552 with a plurality of systems 554 and an interior 556. Examples of high-level systems 554 include one or more of a propulsion system 518, an electrical system 520, a hydraulic system 522, and an environmental system 524. Any number of other systems may be included. Although an aerospace example is shown, the principles of the disclosure may be applied to other industries, such as the marine and automotive industries.

Systems and methods embodied herein may be employed during any one or more of the stages of the production and service method 500. For example, components or subassemblies corresponding to production process 502 may be fabricated or manufactured in a manner similar to components or subassemblies produced while the aircraft 550 is in service. Also, one or more apparatus embodiments, method embodiments, or a combination thereof may be utilized during the production stages 502 and 504, for example, by substantially expediting assembly of or reducing the cost of an aircraft 550. Similarly, one or more of apparatus embodiments, method embodiments, or a combination thereof may be utilized while the aircraft 500 is in service, for example and without limitation, to maintenance and service 510.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. An elastomeric apparatus for use in manufacture of a composite component, comprising:
   an elastomer housing; and
   a plurality of magnetic components within the elastomer housing in a predetermined manner such that application of a magnetic field to the elastomer apparatus changes a rigidity state of the elastomer housing to a secondary state, wherein the secondary state is supportive of a surface compaction applied to the elastomer housing.

2. The elastomeric apparatus of claim 1, wherein the elastomer apparatus has a first state in which the elastomer housing is flexible in an absence of the magnetic field, and the secondary state in which the elastomer housing is rigid in a presence of the magnetic field.

3. The elastomeric apparatus of claim 2, further comprising:
a plurality of rods within the elastomer housing extending along a width of the housing,
wherein respective magnetic components are mounted to respective rods of the plurality of rods in a rotatable manner, and
wherein the magnetic components react to the magnetic field in a way that aligns the magnetic components by rotating on the plurality of rods to cause the elastomer housing to have the secondary state, and wherein the magnetic components cause the elastomer housing to have the first state in absence of the magnetic field.

4. The elastomeric apparatus of claim 1, wherein during application of the magnetic field to the elastomer apparatus, the plurality of magnetic components align within the elastomer housing to provide an internal rigid structure for the elastomer housing.

5. An elastomeric apparatus for use in manufacture of a composite component, comprising:
a housing having a flexible surface state and a rigid surface state;
one or more rods within the housing extending along the housing; and
a plurality of magnetic components mounted to the one or more rods in a rotatable manner, wherein the plurality of magnetic components react to a magnetic field in a way that aligns the magnetic components by rotating on the one or more rods to cause the housing to have the rigid surface state, and wherein the plurality of magnetic components cause the housing to have the flexible surface state in absence of the magnetic field.

6. The elastomeric apparatus of claim 5,
wherein the one or more rods include a center spine rod extending along a length of the housing, and the plurality of magnetic components are each mounted to the center spine rod spaced apart along the length of the housing.

7. The elastomeric apparatus of claim 5,
wherein the one or more rods include a plurality of rods within the housing extending along a width of the housing, and
respective components of the plurality of magnetic components are mounted to respective rods of the plurality of rods in the rotatable manner.

8. The elastomeric apparatus of claim 7, wherein the plurality of magnetic components include an upper arm coupled to a lower arm via a rotational bearing, and
wherein the respective rods of the plurality of rods are positioned through respective rotational bearings of the plurality of magnetic components.

9. The elastomeric apparatus of claim 5, wherein the plurality of magnetic components include an upper arm coupled to a lower arm, and
wherein the upper arm comprises a magnetically sensitive material, and
wherein the lower arm comprises a non-magnetically sensitive material.

10. The elastomeric apparatus of claim 5, wherein the plurality of magnetic components cause the housing to have the rigid surface state by aligning vertically along a length of the housing through an upward rotation so as to contact a top and a bottom of the flexible housing.

11. The elastomeric apparatus of claim 5, wherein the plurality of magnetic components cause the housing to have the rigid surface state by aligning along a length of the housing to be substantially perpendicular to the one or more rods.

12. The elastomeric apparatus of claim 5, wherein the one or more rods include a plurality of rods, and the plurality of magnetic components are mounted on the plurality of rods that are spaced apart from each other along a length of the housing such that the plurality of magnetic components lay substantially horizontal or non-vertical along the length of the housing in the absence of the magnetic field.

13. The elastomeric apparatus of claim 5, further comprising a plurality of springs coupled to the one or more rods to cause the plurality of magnetic components to rotate to be substantially horizontal or non-vertical along a length of the housing in the absence of the magnetic field.

14. The elastomeric apparatus of claim 13, further comprising a plurality of rotation stops coupled to the one or more rods, such that in the absence of the magnetic field, the plurality of springs cause the plurality of magnetic components to rotate until contact with the plurality of rotation stops.

15. The elastomeric apparatus of claim 5, further comprising a plurality of links coupling the plurality or rods along a length of the housing.

16. A method for altering a surface rigidity of an elastomeric apparatus, comprising:
providing a housing of the elastomeric apparatus having a first surface state and a second surface state;
changing a surface rigidity state of the housing during localized exposure to a magnetic field, such that the housing has the first surface state; and
changing the surface rigidity state of the housing in absence of the magnetic field, such that the housing has the second surface state.

17. The method of claim 16, wherein the first surface state is a rigid surface state, and the second surface state is a flexible surface state.

18. The method of claim 16, wherein the first surface state is a flexible surface state, and the second surface state is a rigid surface state.

19. The method of claim 16, further comprising:
applying the magnetic field during automated lamination so as to cause the elastomeric apparatus to react to a force of a lamination application device; and
after the completion of automated lamination, causing the surface rigidity state of the housing to return to the flexible surface state.

20. The method of claim 16, further comprising:
placing the elastomeric apparatus into an internal cavity of a mandrel;
applying the magnetic field to the elastomeric apparatus to cause the surface rigidity state of the housing to be a rigid surface state;
applying a composite material on the mandrel; and
removing the magnetic field from the elastomeric apparatus to cause the surface rigidity state of the housing to be a flexible surface state.

* * * * *